Feb. 23, 1960 T. N. DE PEW ET AL 2,925,921
PALLET STACK SUPPORTING FRAMES
Filed May 23, 1958 2 Sheets-Sheet 2

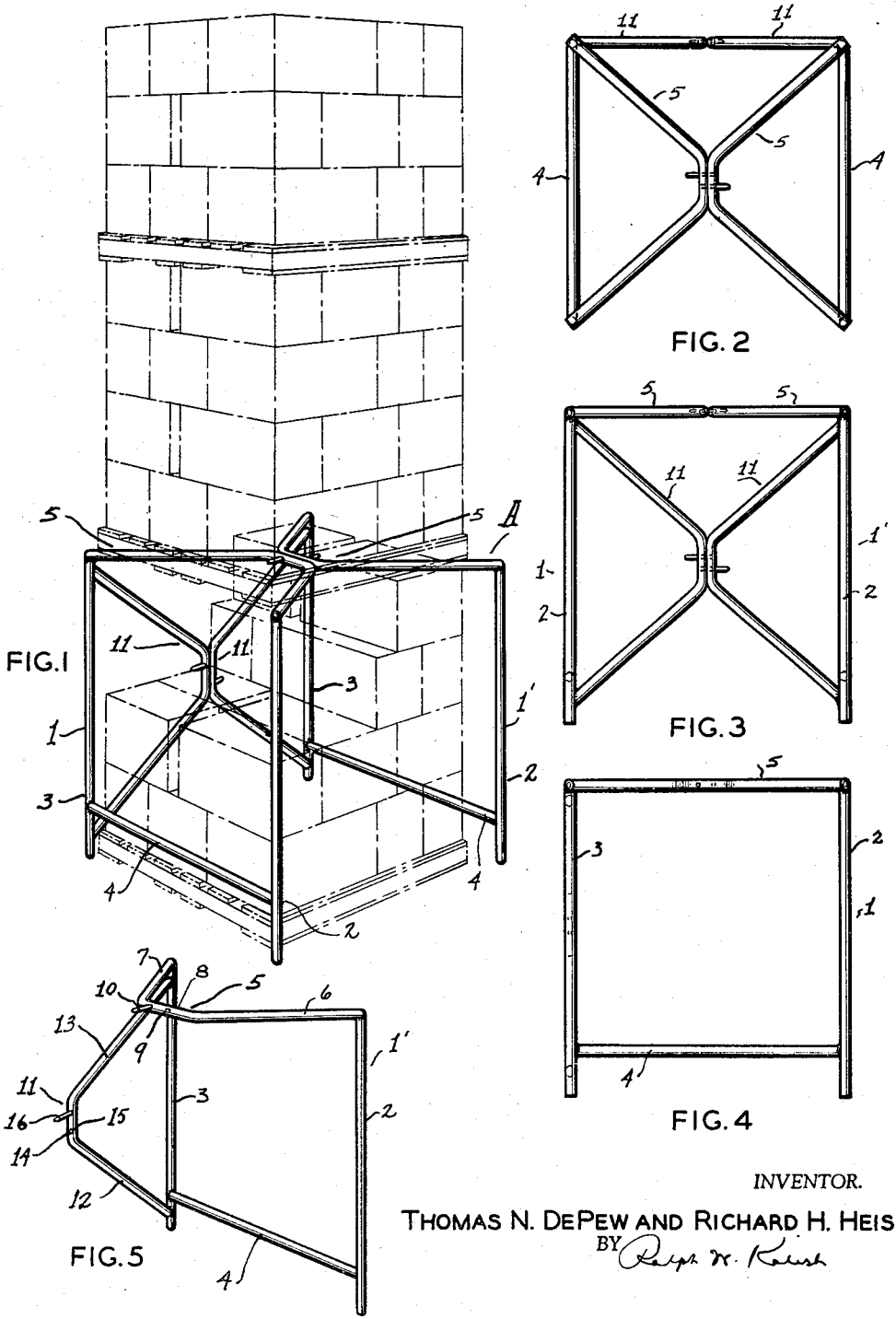

INVENTOR.
THOMAS N. DePEW AND RICHARD H. HEISE
BY
ATTORNEY

United States Patent Office 2,925,921
Patented Feb. 23, 1960

2,925,921

PALLET STACK SUPPORTING FRAMES

Thomas N. De Pew, University City, and Richard H. Heise, St. Louis, Mo.; said Heise assignor, by direct and mesne assignments, to said De Pew Application May 23, 1958, Serial No. 737,316

5 Claims. (Cl. 211—148)

This invention relates in general to storage systems and, more particularly, to a frame for supporting a tier of loaded pallets.

With the use of storage pallets in warehouses and the like, it is common practice to stack or tier loaded pallets one upon the other to make effective use of over-head space. This system is expedient wherein withdrawals from stock may be made in complete pallet loads, as by a fork lift truck or other means, with the uppermost pallet and associated load being the first to be removed which, in no way, will disturb the underlying loads. However, in operations where it has been necessary to remove, as in the course of filling orders, individual load units, such as containers, cartons, etc., from a palletload, a joint problem of economic handling and proper utilization of storage space has developed. Obviously, the withdrawal of such units from the top pallet of a tier is time-consuming and laborious, and if such withdrawals are to be made from the normally bottom or lowermost pallet, such, with its constantly decreasing load, is inadequate to support the superimposed tier. Generally, at the present, in grocery warehouses and other like concerns handling numerous items to be sold in less than full pallet loads, the load units are "picked" from a pallet, referred to as a "picking pallet" resting directly on the floor with the overhead area unoccupied and thus constituting a costly waste. It is readily seen that with such a "picking pallet" for each of innumerable items, a most substantial proportion of a warehouse is rendered unavailable at a severe economic loss.

Therefore, it is an object of the present invention to provide a frame adapted to support a tier of fully loaded pallets spacedly above a floor or other support surface and to define a space below such tier for receiving a loaded pallet to allow withdrawal of load units therefrom without disturbing the tier.

It is another object of the present invention to provide a frame of the character stated which is not engaged to or upon any pallet whether of the overlying tier or the one disposed within the frame so that there are no involved steps or procedures attendant with disposing pallets upon or within the frame or removing same therefrom.

It is a further object of the present invention to provide a frame of the character stated which is of two-part construction, being adapted for ready assembly and disassembly so that during periods of disuse the same may be stored in minimum space.

It is an additional object of the present invention to provide a two-part frame of the character stated having means for effecting secure engagement of the two parts for operative purposes; which when assembled provides a sturdy and stable structure; which may be economically produced; which is durable in usage; and the use of which assures economical utilization of the heretofore considered wasted storage space above a "picking" pallet.

Other objects and details of the invention will be apparent from the following description, when read in connection with the accompanying drawings (2 sheets) wherein:

Figure 1 is a perspective view of a pallet stack supporting frame constructed in accordance with and embodying the present invention illustrating same in operative position.

Figure 2 is a top plan view.

Figure 3 is a front view.

Figure 4 is a side view of one of the frame elements.

Figure 5 is a perspective view of one of the frame elements.

Figure 6:
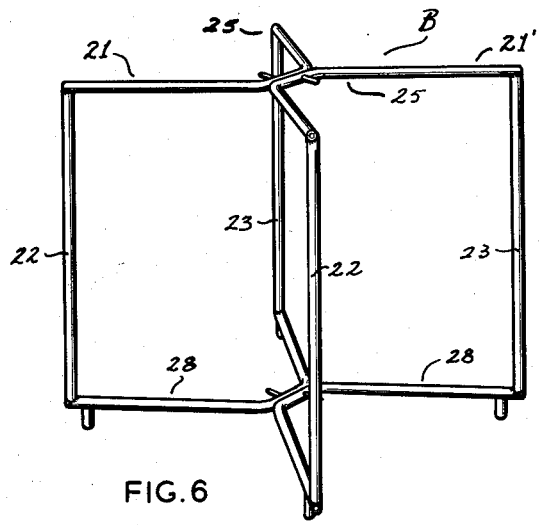
Figure 6 is a perspective view of another form of pallet stack supporting frame constructed in accordance with and embodying the present invention.
Figure 7:
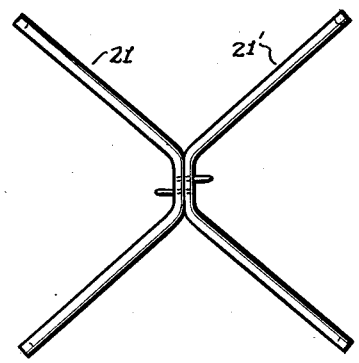
Figure 7 is a top plan view of the frame shown in Figure 6.
Figure 9:
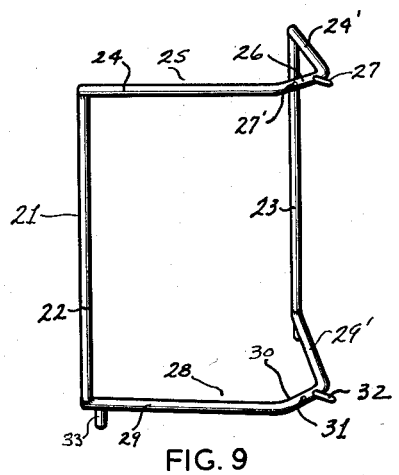
Figure 9 is a perspective view of a frame element of the frame shown in Figure 6.
Figure 8:
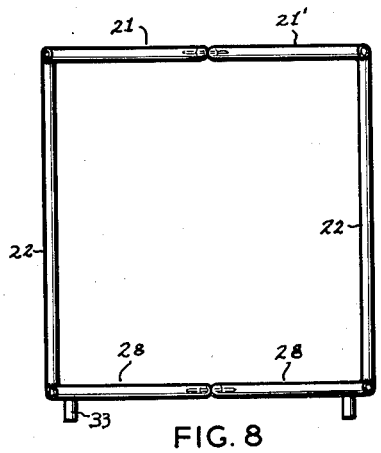
Figure 8 is an elevation view of the frame shown in Figure 6.

Referring now by reference characters to the drawings which illustrate preferred embodiments of the present invention, A designates a pallet stack supporting frame constructed preferably of piping or tubing, but which may be fabricated from any suitable sturdy stock and which comprises a pair of separable elements 1, 1'.

Each element 1, 1' includes a pair of vertically presented, parallel, spaced-apart front and rear posts 2, 3, which at their lower ends are interconnected by a transverse member 4 located upwardly of the floor or other support surface. Forming the top of frame A are cooperating, horizontal, connectable top members 5 of each element 1, 1', presented in planar parallel relation to the support surface; each top member 5 having a pair of inwardly converging legs 6, 7 which in their outer end portions are fixed, as by welding, to the upper ends of the related posts 2, 3, respectively, and which at their inner ends are connected by a central or medial portion 8, of less length than the distance between the associated posts 2, 3, whereby each top member 5 is endowed with a generally blunted V-shaped or trough configuration. Central portions 8 of top members 5 will be in mutual abutting relationship throughout their extent when said members are engaged; said central portions 8 being of like dimension so that the line of contact therebetween will be substantially in parallel relation to the front-to-back medial line of the plane described by the lower ends of posts 2, 3. Each central portion 8 of each top member 5 is provided with an opening 9 and a pin member 10, which are mutually axially parallel and are axially normal to the axis of the respective central portion 8 whereby the pin 10 of one top member 5 will be received in the opening 9 of the other for joining top members securely together; it being noted that pins 10 are of such length so as to extend through and beyond the corresponding central portion 8 to prevent any accidental disengagement of elements 1, 1'. As will be developed hereinbelow, the engaged top members 5 provide a support, spacedly above the floor, for a tier of loaded pallets. Mounted on the rear post 3 of each element 1, 1' for projection toward the other of such post 3, and for defining the normally rearward side portion of frame A, are vertically presented, cooperating, joinable, brace members 11, each of which comprises a pair of converging legs 12, 13 which at their outer ends are fixed to the lower end and upper end portions respectively of the associated post 3, and which at their inner ends are continuous with a central or medial portion 14, axially parallel to legs 3; said central portions 14 being in abutment when brace members 11 are in engaged relationship. Thus, brace members 11 are substantially the same configuration as top members 5 in being of a generally blunted V-shaped or trough contour, with each such portion being provided with spaced-apart, axially parallel opening 15 and pin 16 for interengagement of the said brace members 11.

It will be observed that elements 1,1' are of complementary construction, and when united through top members 5 and brace members 11 provide a stable, bin-defining frame with unimpeded access to the embraced space, or interior thereof, between front posts 2. The height of frame A is such that the same may receive a fully loaded storage pallet which may be easily and unobstructedly moved into, or from, frame A by conventional means, such as a fork-lift truck, straddle truck, or the like; with top members 5 being spaced above the top of the pallet load to allow a warehouseman to "pick" in a facile manner individual load units from the pallet within frame A. The "picking" of load units from such pallet will not interfere with a tier of loaded pallets disposed upon the engaged top members 5 (Figure 1) so that the overhead space will be economically utilized contemporaneously with "picking" operation from the frame-encased bottom pallet.

When the load upon the bottom pallet, within frame A, has been entirely removed, the empty pallet may be readily withdrawn, and replaced by a loaded pallet, which may be removed from the top of the tier above frame A.

By its unique construction, frame A will be sturdy and reliable when in assembled state as the cooperating top and brace members 5,11, respectively, firmly unite elements 1,1' into integrated structure resistant to any outwardly directed, element-spreading forces developed by the superimposed load. When disassembled, elements 1,1' may be stored in a very small space to permit full employment of the previously occupied warehouse area for any desired purpose.

Another form of pallet stack supporting frame indicated B (see Figure 6) may be provided, which comprises a pair of identical, separable elements 21,21', each of which includes a pair of vertically presented, parallel posts 22,23 at the upper ends of which are fixed the outer end portions of inwardly converging legs 24,24' of a horizontal, connectable top member 25; said legs 24,24' in their inner end portions being connected by a central or medial portion 26 provided with a pin and an opening 27,27' for respectively uniting said members 25 securely together; whereby said top members 25 are structurally similar in all respects to top members 5 of frame A hereinabove described.

To the lower ends of posts 22,23 of each element 21,21' there is secured a horizontal, connectable base member 28 in planar parallel, vertically aligned relation to the related top member 25 and of like character thereto, as each comprises inwardly converging legs 29,29' and a central or medial portion 30 provided with axially parallel opening 31 and pin 32.

Extending downwardly from each leg 29,29' of the base members 28 is a short, standard-forming leg 33, positioned slightly inwardly of, and axially parallel to, the adjacent post 22,23, as the case may be. The height of said legs 33 is such as to allow the arms of a straddle truck to project into the space between base members 28 and the floor for disposal thereon, and removal therefrom, of a pallet. The distance of said legs 33 inwardly of posts 22,23 permits of unobstructed movement of such straddle arms between juxtaposed frames B as the same would normally be arranged with a storage area. Furthermore, it is to be especially noted that the outer ends of legs 21,21' and 29,29' of members 25,28, respectively, are flush with the proximate post so that adjacent frames B may be in abutting relation for maximum use of warehouse space.

As each section 21,21' is of identical construction the same are interchangeable so that the loss or damage of one such element will merely necessitate the replacement of a single element rather than of the entire frame B; and in view of this identity the same may be most compactly nested when detached so as to be storable in most limited space.

In usage, engaged top members 25 provide a support for a tier of loaded pallets whereby the warehousing area immediately above frame B can be fully utilized. Similarly joined base members 28 form a support surface for a single loaded "picking" pallet to be disposed within the frame B, which latter is of such height that top members 25 are located sufficiently above the top level of the load of said pallet to allow for convenient "picking" therefrom, whereby a warehouseman may readily withdraw any number of load units without disturbing the tier of loaded pallets supported upon top members 25.

As stated, base members 28 are presented in elevated relation to the floor or support surface to allow a straddle truck to be used for disposing a loaded pallet upon said base members 28 or move an empty pallet therefrom. Manifestly, conventional fork-lift trucks may be employed for like purpose if desired. With the present construction it will be seen that frame A may be entered from any of its four sides, between adjacent posts, so that there is no proper front or back whereby the same may be placed in operative position without regard to disposition.

The frames constructed in accordance with the present invention may be most economically produced and form rigid support structures when in use so as to provide the intended double function, that is, present a pallet for "picking" of load units therefrom while simultaneously supporting a tier of fully loaded pallets. Furthermore, no developed skill is required on the part of individuals assembling or disassembling the present invention, since no tools or extrinsic securing components are required.

It should be understood that changes and modifications in the formation, construction, arrangement, and combination of the several parts of the pallet stack supporting frame may be made and substituted for these herein shown and described without departing from the nature and principle of our invention.

Having thus described our invention, what we claim and desire to secure by Letters Patent is:

1. A pallet support frame comprising separable elements, each element comprising a pair of spaced apart, vertically presented, parallel posts, a top member secured to the upper end of each post and disposed in a plane axially normal thereto, means for detachably securing the top members of the elements together, cooperable interengageable members carried on said elements downwardly of the related top members, and means for detachably securing the cooperable interengageable members together.

2. A pallet support frame comprising separable elements, each element comprising a pair of spaced apart, vertically presented, parallel posts, a top member secured to the upper end of each post and disposed in a plane axially normal thereto, means for detachably securing the top members of the elements together, a base member provided on each element in planar parallel, vertically aligned relationship to its respective top member, and means for detachably securing said base members together.

3. A pallet stack support frame as described in claim 2 wherein each base member comprises a pair of mutually converging legs being detachably connected in their inner portions.

4. A pallet stack support frame for maintaining a tier of loaded pallets spacedly above a lower pallet for facile unloading of the latter comprising a pair of separable elements, each element comprising a pair of vertical spaced apart posts, a top member secured upon the upper ends of the posts of each element and being disposed in planar normal relationship to said posts, means for engaging the top members of the elements detachably together to provide a support and a tier of pallets and an enclosed space dimensioned for freely receiving a single loaded pallet between at least one pair of adjacent posts, the posts of said elements being of greater length than the combined height of the said pallet and the load thereon, a brace member mounted on one post of each element and projecting toward the corresponding post of the opposite element, said brace members being disposed within a plane normal to the plane of the top members, and means for securing said brace members detachably together for effectively defining a closure to one side of the support frame.

5. A pallet stack support frame as described in claim 4 wherein each brace member comprises a pair of mutually converging legs secured respectively in their outer end portions to the upper and lower end portions of the associated post, said legs being connected in their inner end portions, and the means for securing said brace members together being presented in the area of connection between said converging legs.

References Cited in the file of this patent

UNITED STATES PATENTS

| | | |
|---|---|---|
| 2,031,811 | Azzara | Feb. 25, 1936 |
| 2,828,933 | De Pew | Apr. 1, 1958 |

FOREIGN PATENTS

| | | |
|---|---|---|
| 158,883 | Austria | June 10, 1940 |